(12) United States Patent
Cist

(10) Patent No.: US 12,111,391 B1
(45) Date of Patent: Oct. 8, 2024

(54) POSITIONAL ACCURACY USING GROUND PENETRATING RADAR

(71) Applicant: Geophysical Survey Systems, Inc., Nashua, MA (US)

(72) Inventor: David Cist, Winchester, MA (US)

(73) Assignee: GEOPHYSICAL SURVEY SYSTEMS, INC., Salem, NH (US)

( * ) Notice: Subject to any disclaimer, the term of this patent is extended or adjusted under 35 U.S.C. 154(b) by 346 days.

(21) Appl. No.: 17/844,211

(22) Filed: Jun. 20, 2022

Related U.S. Application Data

(60) Provisional application No. 63/227,452, filed on Jul. 30, 2021.

(51) Int. Cl.
 *G01S 13/88* (2006.01)
(52) U.S. Cl.
 CPC .................................. *G01S 13/885* (2013.01)
(58) Field of Classification Search
 None
 See application file for complete search history.

(56) References Cited

U.S. PATENT DOCUMENTS

| | | | | |
|---|---|---|---|---|
| 4,325,066 A * | 4/1982 | Grettenberg | ........... | G01C 9/005 |
| | | | | 342/61 |
| 6,094,157 A * | 7/2000 | Cowdrick | ............. | G01S 13/426 |
| | | | | 342/191 |
| 9,199,643 B1 * | 12/2015 | Zeng | ...................... | G01S 13/726 |
| 2020/0050208 A1 * | 2/2020 | Frick | ...................... | G06V 10/462 |
| 2023/0236604 A1 * | 7/2023 | Frick | .................... | G05D 1/0257 |
| | | | | 701/23 |

FOREIGN PATENT DOCUMENTS

CN 112902952 A * 6/2021 ........... G01C 21/165

* cited by examiner

*Primary Examiner* — Bernarr E Gregory
(74) *Attorney, Agent, or Firm* — Michael J. Feigin, Esq.; Feigin and Fridman LLC

(57) ABSTRACT

A system for obtaining improved position accuracy with ground penetrating radar includes a position locating device capable of detecting objects, such as substrate objects, at at least two points along an extent thereof. Methods for its use include collecting, modeling, and comparing detected radar data with other detected radar data and/or previously input data and/or assumed and/or predicted data.

20 Claims, 6 Drawing Sheets

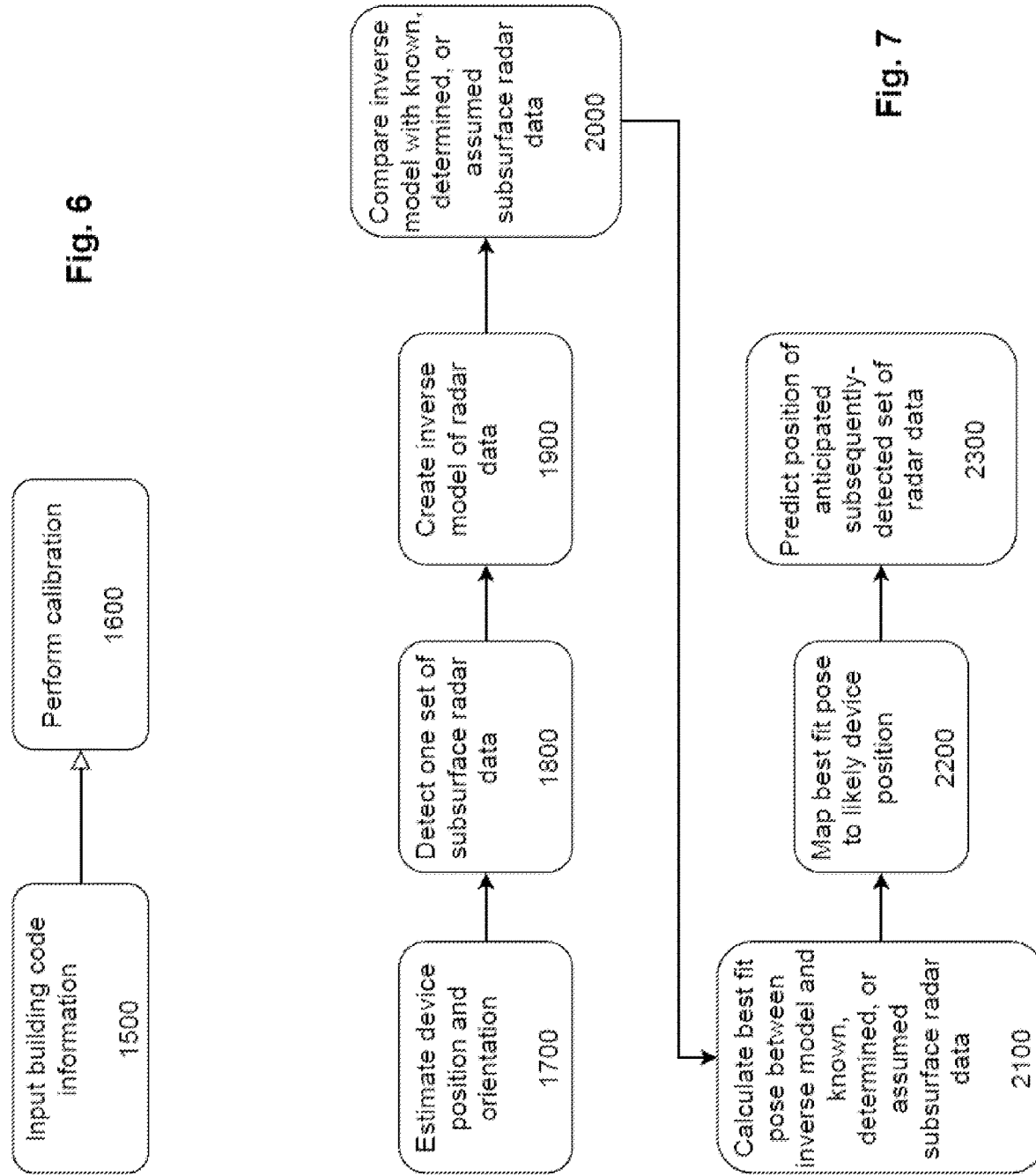

POSITIONAL ACCURACY USING GROUND PENETRATING RADAR

FIELD OF THE DISCLOSED TECHNOLOGY

The disclosed technology relates generally to position determination, and more specifically, to improving position determination using a combination of subsurface structure location determination and Ground Penetrating Radar (GPR) scanning devices.

BACKGROUND

Accurately knowing the position and orientation, or Pose, of an object is vital in myriad applications, from automated vacuum cleaners to space shuttles. An object's Pose—its 3D position (X,Y,Z) and its orientation (Pitch, Roll and Yaw)—comprise the six Degrees of Freedom (6DoF) needed to track a solid object as it moves through space. Many methods can be used to track Pose, including cameras, Inertial Measurement Units (IMUs) or LiDAR.

One of the main challenges of calculating Pose for most of these technologies is "drift", a slow change and/or error in determined position. Errors due to drift range from mistakes in videogames to errors in missile targeting. Typical methods for compensating for drift including use of an external reference (a "Global Reference"), such as a camera or a set of sensors in fixed locations surrounding the tracked target. Additionally, good positioning typically must rely on complimentary methods to compensate for the failure modes of various forms of Global References. For example, if a camera is jostled while acting as a Global Reference, all subsequent Pose estimations will likely require recalibration.

Thus, there is a need for limiting the failure modes of the current Pose estimation methods, such as when applied to GPR surveys. This and other problems are solved by embodiments of the disclosed technology, as described below.

SUMMARY OF THE DISCLOSED TECHNOLOGY

A position locating device (hereafter a PLD) of embodiments of the disclosed technology includes one or more ground penetrating radar transceivers and one or more location determining systems. The device is configured such that detection, by way of a ground penetrating radar transceiver, of a first subsurface object at, at least, two different points thereon, is used to correct (calibrate and/or recalibrate) a pose estimation of the PLD. The at least two different points, in embodiments, extend in a direction other than a path of travel of the PLD during the detection. The pose correction is, in some embodiments, based on an assumed or determined linear or predictable extent (hereafter "linear extent") of the first subsurface object.

In various embodiments, the direction of the extent of the at least two different points may be perpendicular to the path of travel of the PLD during the detection. A longest extent of the first subsurface object may be, in embodiments, linear and at an angle different from the path of travel of the PLD.

The device may be further configured such that following the aforesaid detection of the first subsurface object and the aforesaid first pose correction, a subsequent detection, by way of the ground penetrating radar transceiver, of a second subsurface object from at least two different points thereon is used to further correct the pose of the PLD relative to the first and second subsurface objects. The subsequently detected subsurface object from at least two different points may extend in a direction other than a path of travel of the PLD during the subsequent detection. In some embodiments, the pose correction may be based on an assumed or determined linear extent of the first and second subsurface objects.

In some embodiments, a longest extent of one of the first and second subsurface objects may be perpendicular relative to the path of travel of the PLD while a longest extent of the other subsurface object may be at a non-right angle relative there-to. This may be the case both during the pose correction occurring when the PLD travels over the first subsurface object and during the pose correction occurring when the PLD travels over the second subsurface object.

The process of pose correction, in some embodiments, includes detections of the subsurface object along a first axis and a second axis, followed by a determination of a location of the PLD relative to each of the first and second axes. In embodiments, the first axis is perpendicular to the second axis and the subsurface axis is known, determined, and/or assumed to be linear. Each of said first axis and the second axis may be located along a longest linear extent and/or a shortest linear extent and/or a diagonal linear extent of said subsurface object. "Diagonal linear extent" is defined as a linear extent at an acute angle relative to a longest linear extent and/or a shortest linear extent and/or a linear extent of a known or detected length. The determined location may be used, in various embodiments, to detect the pose of the PLD independently and/or to confirm and/or specify a predetermined or predicted position or path thereof.

In some embodiments, the pose correction may further require a rotational angle of the PLD relative to the subsurface object or objects.

In some embodiments, the assumed linear extent of the subsurface object may be based on known information from for example building codes, BIM models or reconstructed GPR images inputted into the PLD.

A method of using the PLD, in embodiments, includes the steps of detecting, in a first detection, a first subsurface object at, at least, two different points thereon, and of correcting the pose estimation of the PLD relative to the first subsurface object. In various embodiments, the at least two different points extend in a direction other than a path of travel of the device during the step of first detection, and the step of correction is performed using the at least two different points. The step of correction may be based on an assumed or determined linear extent of the subsurface object.

During the step of first detection, the at least two different points may extend in a direction perpendicular to the path of travel of the PLD. Furthermore, in embodiments, a longest extent of the first subsurface object may be perpendicular or at a non-right angle relative to the path of travel of the PLD during the step of first detection.

In embodiments of the disclosed technology, the above-described method further includes the subsequent steps of further detecting, in a second detection, a second subsurface object at, at least, two different points thereof, and further correcting a pose of the PLD relative to the first and second subsurface objects. The at least two different points detected during the step of second detection may extend in a direction other than a path of travel of the PLD during one or both of the steps of first detecting and second detecting. The step of further correcting may use the at least two different points detected during the second step of detection and/or may be based on an assumed or determined linear extent of the first subsurface object and/or the second subsurface object.

In some embodiments, a longest extent of one of the first and second subsurface objects may be perpendicular relative to the path of travel of the PLD while a longest extent of the other subsurface object may be at a non-right angle relative there-to. This may be the case both during the step of pose correction occurring when the PLD travels over the first subsurface object and during the step of correction occurring when the PLD travels over the second subsurface object.

In further embodiments, the aforementioned steps of pose correction may each include the steps of detecting a respective subsurface object in a first axis and in a second axis, and determining a location of the PLD relative to each of the detected first axis and the detected second axis.

In embodiments, the two axes are perpendicular to each other and the respective subsurface object is known, determined, and/or assumed to be linear, such that each of the first and second axis is located along a longest linear extent and/or a shortest linear extent and/or a diagonal linear extent of respective subsurface object. The determined location, in various embodiments of the disclosed technology, is used to detect a pose of the PLD independently and/or to confirm and/or specify a predetermined or pre-detected position thereof.

In embodiments, the PLD further includes at least one antenna. The aforementioned steps of pose correction may each further include a step of detecting a rotational angle of the PLD relative to the respective subsurface object by way of the antenna.

The PLD, in various embodiments, further includes an input device. The above-described method, in some embodiments, includes a step of inputting known building code information into the input device. The known building code information may include at least an assumed linear extent of each respective subsurface object mentioned above.

Described differently, a method of correcting for position errors of a PLD of embodiments of the disclosed technology may include the following steps: determining a substation pose of a PLD; detection, in a first step of detection, by way of a ground penetrating radar transceiver of the PLD, at least one set of subsurface radar data; creating, using the at least one set of subsurface radar data, an inverse model of reflections and/or diffractions included therein; comparing the inverse model with known, determined, and/or assumed subsurface data; calculating a best-fit pose between the inverse model and the known, determined, and/or assumed subsurface data; mapping the best-fit pose to a most likely pose of the PLD; and predicting at least one most likely position of at least one anticipated subsequent set of subsurface radar data to be detected, in at least a second step of detection, by way of the ground penetrating radar transceiver of the PLD.

"Inverse model" is defined as an analytical and/or numerical model created based on a difference between a first set and a second set of data, the first set of data being detected and the second set of data being considered "ideal". "Inverse model" is further defined as an analytical and/or numerical model created based on a difference between a first set and a second set of data, the first set of data being detected and the second set of data being subsequently detected. "Subsurface data" is defined as data relating to a substance, interior, and/or internal makeup of at least a portion of a structure and/or location.

The method, in various embodiments, may further include the following steps: detecting, in a second step of detection, at least one subsequent set of subsurface radar data; creating, using the at least one subsequent set of subsurface radar data, an inverse model of reflections and/or diffractions included therein; comparing the inverse model with known, determined, and/or assumed subsurface data; calculating a best-fit pose between the inverse model and the known, determined, and/or assumed subsurface data; mapping the best-fit pose to a most likely pose of the PLD; comparing most likely position determined based on the at least one subsequent set of subsurface radar data with the previously-predicted most likely pose of the PLD; determining, based on the comparison with the previously-predicted most likely position, a most likely pose of the PLD; and predicting, based on the last-determined most likely pose of the PLD, at least one most likely position of at least one additional anticipated subsequent set of subsurface radar data to be detected, in at least a third detection, by way of the ground penetrating radar transceiver of the PLD.

Any device or step to a method described in this disclosure can comprise or consist of that which it is a part of, or the parts which make up the device or step. The term "and/or" is inclusive of the items which it joins linguistically and each item by itself.

BRIEF DESCRIPTION OF THE DRAWINGS

FIG. 6 shows a flowchart of a method of use of a PLD for obtaining improved positional accuracy with ground penetrating radar using a single input step of an embodiment of the disclosed technology.

FIG. 7 shows a flowchart of a method of use of a PLD for obtaining improved positional accuracy with ground penetrating radar using multiple detection steps of an embodiment of the disclosed technology.

DETAILED DESCRIPTION OF EMBODIMENTS OF THE DISCLOSED TECHNOLOGY

A system for obtaining improved position accuracy with ground penetrating radar includes a PLD capable of detecting objects, such as substrate objects, at at least two points along an extent thereof. Methods for its use include collecting, modeling, and comparing detected radar data with other detected radar data and/or previously input data and/or assumed and/or predicted data.

Embodiments of the disclosed technology will become more clear in view of the following discussion of the figures.

Figure 1:
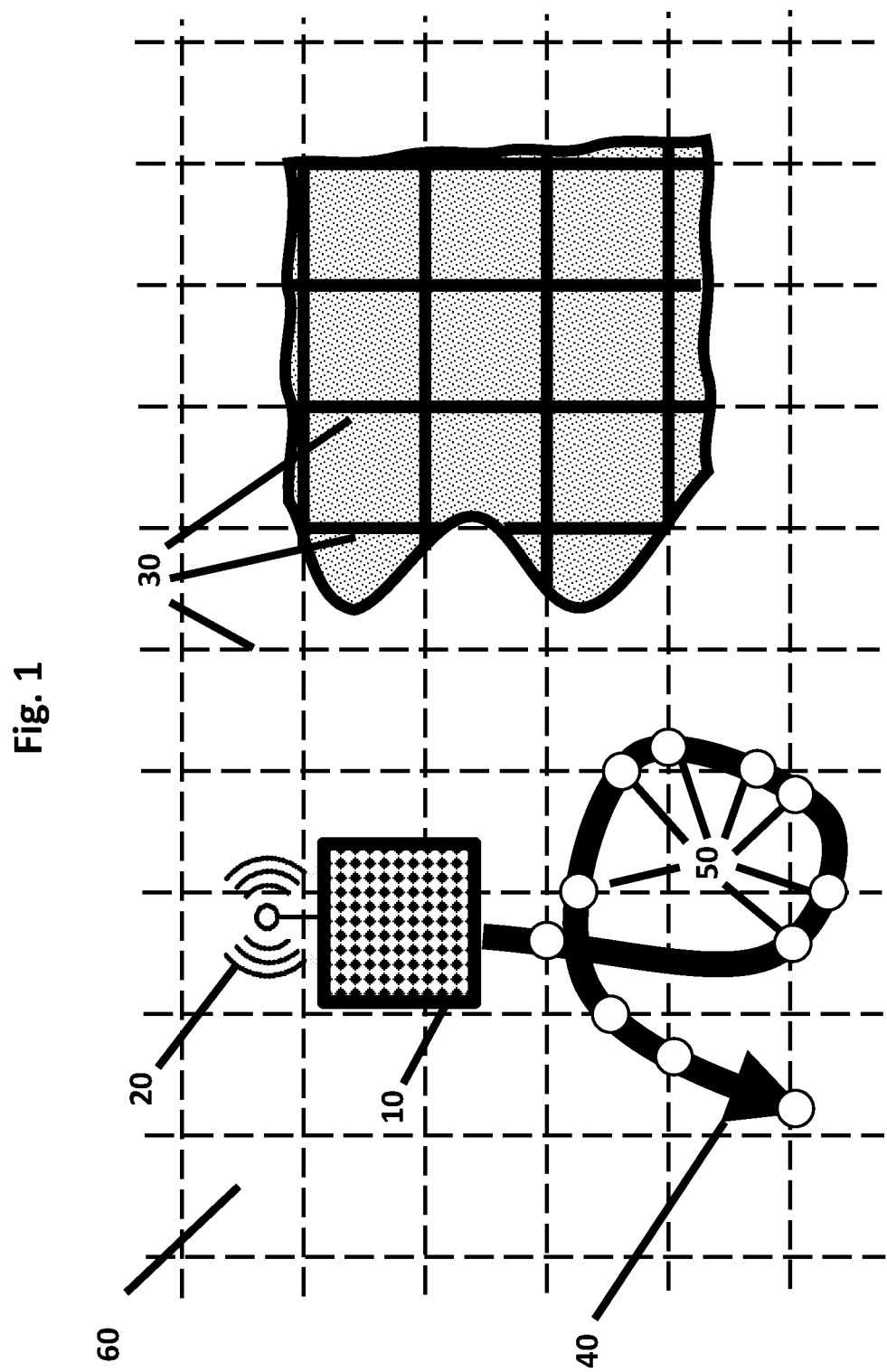
FIG. 1 shows a top plan of elements involved in obtaining improved positional accuracy with ground penetrating radar of an embodiment of the disclosed technology.
Figure 2:
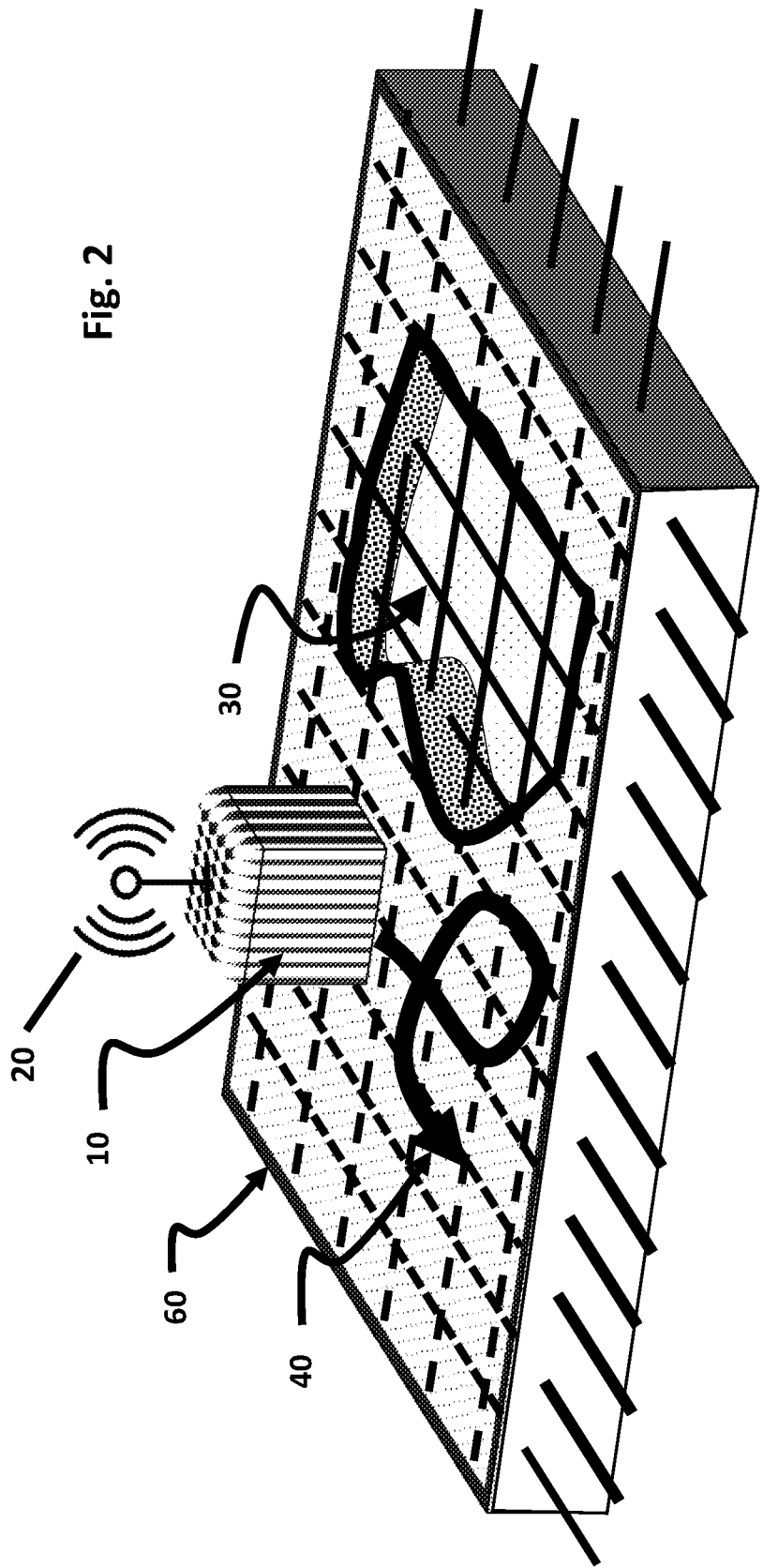
FIG. 2 shows a front right side elevation view of the elements of FIG. 1 of an embodiment of the disclosed technology.

FIG. 1 shows a top plan of elements involved in obtaining improved positional accuracy with ground penetrating radar of an embodiment of the disclosed technology. FIG. 2 shows a front right side elevation view of the elements of FIG. 1 of an embodiment of the disclosed technology. A radar system 10 is equipped with a Locating Determining System 20. Together (10 and 20) they are called the Position Locating Device (PLD). The radar system 10, in the embodiment shown, is capable of detecting one or more subsurface objects 30 within an area 60.

In some methods, the PLD (10 and 20) is capable of moving autonomously and/or of being moved along a path of travel 40 such that the PLD (10 and 20) passes over one or more locations 50 corresponding to one or more subsurface objects 30. In various embodiments, the PLD (10 and 20) performs position location calculations constantly (i.e. at a rate of at least one calculation per second). In other embodiments, the PLD (10 and 20) includes a movement-sensitive component, such as an accelerometer and/or gyroscope, and performs position location calculations constantly while movement of the PLD (10 and 20) is detected. In further embodiments, the PLD (10 and 20) performs position location calculations at a fixed, non-constant rate (such as a rate of one calculation every five seconds).

Figure 3:
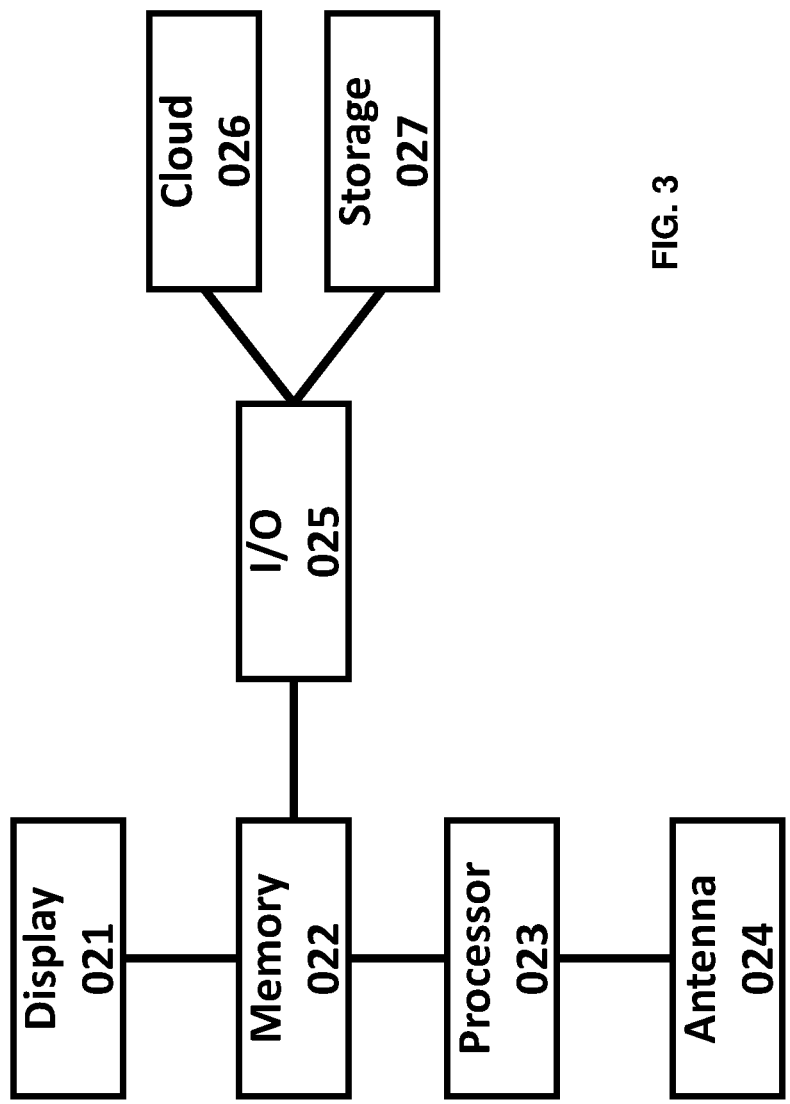
FIG. 3 shows a flowchart of components of a PLD for obtaining improved positional accuracy with ground penetrating radar of an embodiment of the disclosed technology.

FIG. 3 shows a flowchart of components of a PLD for obtaining improved positional accuracy with ground penetrating radar of an embodiment of the disclosed technology. In the embodiment shown, the device 10 includes a display unit 21 which is attached to a memory unit 22. The memory unit 22 is connected to an I/O (input/output) unit 25, which is in turn connected to a cloud unit 26 and a storage unit 27. In other embodiments, the I/O unit 25 may be connected to one or the other of the cloud unit 26 and the storage unit 27.

The memory unit 22 is further connected to a processor unit 23, which is in turn connected to an antenna unit 24. The antenna unit 24 may include any system known within the art to be capable of transmitting, and receiving ground-penetrating radar data. The processor unit 23 may be any system capable of interpreting, analyzing, and/or modeling ground-penetrating radar data.

In some embodiments of the disclosed technology, the device 10 further includes an input unit capable of receiving input, entered manually or automatically, including building data, building code data, previously detected and/or predicted radar data, and/or previously built and/or predicted models based on radar data.

Any of the above-described units, apart from the antenna unit 24, may be connected to the other above-described units in the configuration described above by way of a virtual connection. Any of the above-described units may include multiple internal units, either working redundantly (such that each respective internal unit behaves as an individual unit) or working in a distributed format (such that the overall unit appears to behave as a cohesive whole).

Figure 4:
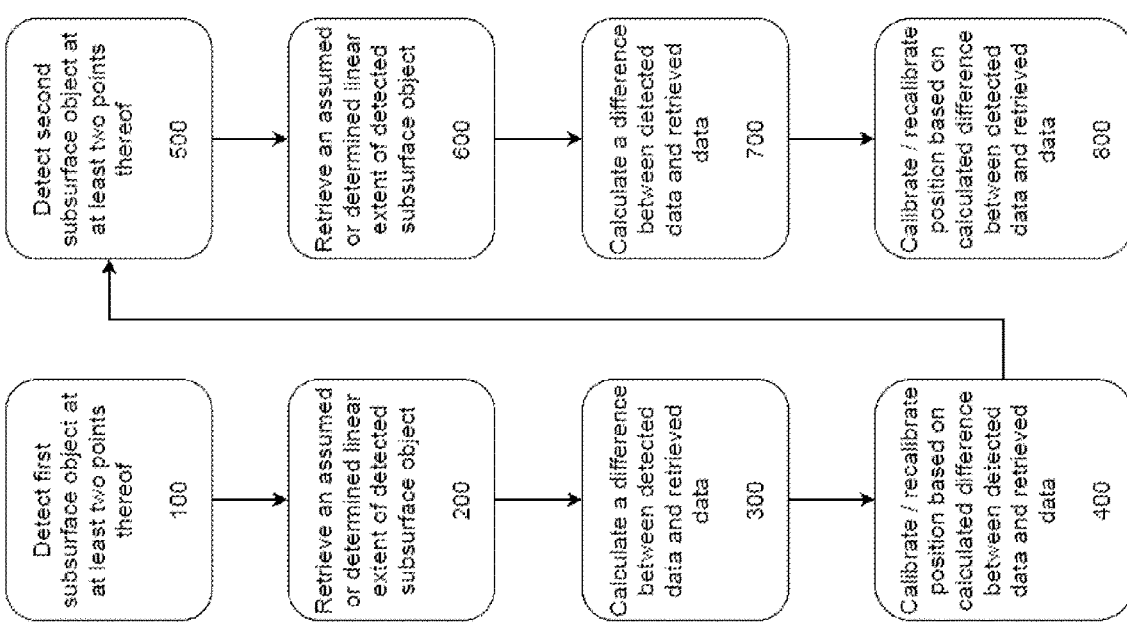
FIG. 4 shows a flowchart of a method of use of a PLD for obtaining improved positional accuracy with ground penetrating radar using multiple detection steps and multiple retrieval steps of an embodiment of the disclosed technology.

FIG. 4 shows a flowchart of a method of use of a PLD for obtaining improved positional accuracy with ground penetrating radar using multiple detection steps and multiple retrieval steps of an embodiment of the disclosed technology. In a step 100, the device 10 detects a first subsurface object 30 at at least two points thereof. The two points may be along and/or adjacent to a path of travel 40 of the device 10. In a subsequent step 200, the device 10 retrieves an assumed or determined linear extent of the detected subsurface object 30. The assumed or determined linear extent, in embodiments, is retrieved by the memory unit 22 of the processor from the cloud unit 26 and/or the storage unit 27 by way of the I/O unit 25.

In a subsequent step 300, the device 10 calculates a difference between the detected data and the retrieved data. The detected data compared to the retrieved data may be a modeled and/or an assumed linear extent of the detected subsurface object 30 based on the at least two detected points thereof. In a subsequent step 400, the device 10 corrects its calculated position based on a difference resulting from the comparison between the detected data and the retrieved data. The pose correction may include calculating and/or recalculating an offset to be applied to position data stored on the device 10.

In a subsequent set of steps 500, 600, 700, 800 one and/or more of the steps 100, 200, 300, 400 are repeated one and/or more times. In some embodiments, each set of subsequent repeated steps 500, 600, 700, 800 is repeated at a constant rate (such as a rate of one repetition per second). In other embodiments, each set of subsequent repeated steps 500, 600, 700, 800 is repeated at a periodic rate (such as a rate of one repetition per five seconds). In further embodiments, each set of subsequent repeated steps 500, 600, 700, 800 is repeated following a prompt from a source external to the device 10 (such as an input command from a user) or following a prompt internal to the device 10 (such as a detection of movement by a movement-sensitive device such as an accelerometer or a gyroscope).

Figure 5:
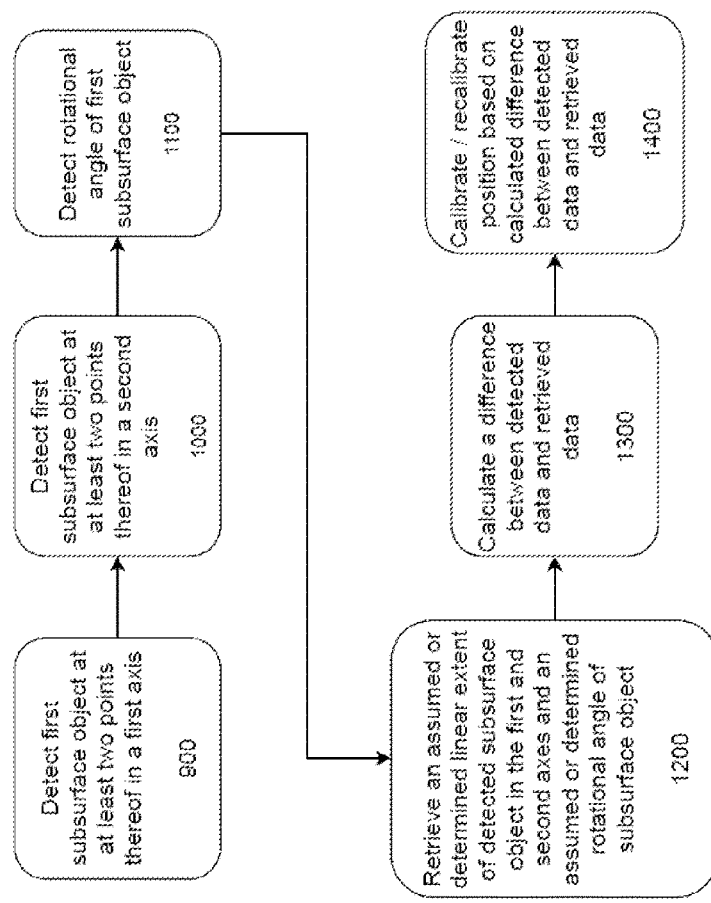
FIG. 5 shows a flowchart of a method of use of a PLD for obtaining improved positional accuracy with ground penetrating radar using a single detection step and a single retrieval step of an embodiment of the disclosed technology.

FIG. 5 shows a flowchart of a method of use of a PLD for obtaining improved positional accuracy with ground penetrating radar using a single detection step and a single retrieval step of an embodiment of the disclosed technology. In a step 900, the device 10 detects a first subsurface object 30 at at least two points thereof along a first axis. The two points may be along and/or adjacent to a path of travel 40 of the device 10. In a step 1000, the device 10 detects a first subsurface object 30 at at least two points thereof along a second axis. The two points may be along and/or adjacent to a path of travel 40 of the device 10. The first and second axes may be perpendicular to each other. Each of the first and second axis may be within a plane parallel to a plane containing the path of travel 40 of the device 10.

In a subsequent step 1100, the device 10 detects a rotational angle of the first subsurface object 30 relative to the device 10 at least two points thereof. The detected rotational angle, in embodiments, is based on an analysis by the device 10, such as in the processor unit 23, of the at least two points detected along the first subsurface object 30 in the first axis and of the at least two points detected along the first subsurface object 30 in the second axis. In a subsequent step 1200, the device 10 retrieves an assumed or determined linear extent of the detected subsurface object 30 as well as an assumed or determined rotational angle thereof. The assumed or determined linear extent and rotation angle, in embodiments, are retrieved by the memory unit 22 of the processor from the cloud unit 26 and/or the storage unit 27 by way of the I/O unit 25.

In a subsequent step 1300, the device 10 calculates a difference between the detected data and the retrieved data. The detected data compared to the retrieved data may be a modeled and/or an assumed linear extent in the first and/or second axes and/or rotational angle of the detected subsurface object 30 based on the at least two detected points thereof in the first axis and/or the at least two detected points thereof in the second axis and the calculated and/or detected rotational angle thereof. In a subsequent step 1400, the device 10 corrects its calculated position based on a difference resulting from the comparison between the detected data and the retrieved data. The pose correction may include calculating and/or recalculating an offset to be applied to position data stored on the device 10.

FIG. 6 shows a flowchart of a method of use of a PLD for obtaining improved positional accuracy with ground penetrating radar using a single input step of an embodiment of the disclosed technology. In a step 1500, information is input into the device 10, such as by way of an input unit into the device 10 itself and/or by way of an input unit into the cloud unit 26 and/or by way of an input unit into the storage unit 27. In a subsequent step 1600, the device 10 then performs a pose correction. The correction of step 1600 may be any form/method thereof, including, but not limited to, forms/methods of correction discussed in this specification.

The information/data input in step 1500 may include data regarding any or all of the following: specific arrangements of subsurface objects 30 in one or more specific places, such as buildings; building codes for one or more category of building; radar signatures of differing materials from which subsurface objects 30 may be constructed; previous radar data from previous detections in one or more places, such as buildings; and/or information, such as year of construction and identity of constructor/constructors, regarding one or more places, such as buildings.

In embodiments, the pose correction of step 1600 may include detecting a pattern and/or a discontinuation of a pattern among detected arrangements of previously-detected subsurface objects 30. The pose correction of step 1600 may further include comparing a set of and/or a set of sets of collected subsurface radar data with a set of building codes input in the step 1500 of inputting, such that one or more building codes may be selected as likely predictors of subsequent sets of subsurface radar data. Following a pose correction of step 1600, the device 10 may transfer, such as by way of the I/O unit 25, a set of collected subsurface radar data and/or a set of meta information, such as pose and/or date-time information to one or both of the cloud unit 26 and the storage unit 27.

FIG. 7 shows a flowchart of a method of use of a PLD for obtaining improved positional accuracy with ground penetrating radar using multiple detection steps of an embodiment of the disclosed technology. In a step 1700, an estimate of device 10 pose is determined, based on previously collected and analyzed data, including (but not limited to) previously collected and analyzed radar, accelerometer, and gyroscope data. In a subsequent step 1800, the device 10 detects a set of radar data relating to one or more subsurface objects 30, such as by way of the antenna unit 24.

In a subsequent step 1900, the device 10 creates, such as by way of the processor unit 23, an inverse model of the collected set of radar data. In various embodiments, the device 10 may create, such as by way of the processor unit 23, any form of model and/or analysis of the collected set of radar data such that a comparison may subsequently be made using the model and/or analysis. In embodiments, the process of creating an inverse model, or any form of model and/or analysis of the collected data, may be performed externally to the device 10, such as by a method of sending the collected set of radar data to a processor unit external to the device 10 and subsequently retrieving, from a same or different processor unit external to the device 10, an inverse model or any form of model and/or analysis of the collected and subsequently sent set of radar data.

In a subsequent step 2000, the device 10 compares, such as by way of the processor unit 23, the inverse model of the collected set of subsurface radar data to a known, determined, or assumed set of subsurface radar data. In a subsequent step 2100, the device 10 calculates, such as by way of the processor unit 10, a best fit pose between the inverse model obtained in the step 1900 of creating an inverse model and the known, determined, or assumed set of subsurface radar data. The step 2000 of comparison and/or the step 2100 of calculation may furthermore produce a measure of difference between the collected set of subsurface radar data and the known, determined, or assumed set of subsurface radar data.

In embodiments, an additional step exists of the device 10 retrieving a set of known, determined, or assumed subsurface radar data. The known, determined, or assumed subsurface radar data, in embodiments, is retrieved by the memory unit 22 of the processor from the cloud unit 26 and/or the storage unit 27 by way of the I/O unit 25.

In embodiments, a second additional step exists of the device 10 creating, such as by way of the processor unit 23, an inverse model of the retrieved set of known, determined, or assumed radar data. The second additional step of creating may be performed in a same or different way as compared to the step 1900 of the device 10 creating an inverse model of the collected set of radar data.

In a subsequent step 2200, the device 10 maps the calculated best fit pose obtained in the step 2100 of calculating to a likely pose of the device 10. In some embodiments, this mapping is performed by way of calculating an offset of the estimated device 10 pose of the step 1700 of estimating. In a subsequent step 2300, the device 10 predicts a pose, such as relative to the device 10, of an anticipated subsequently-to-be-detected set of subsurface radar data.

Figure 8:
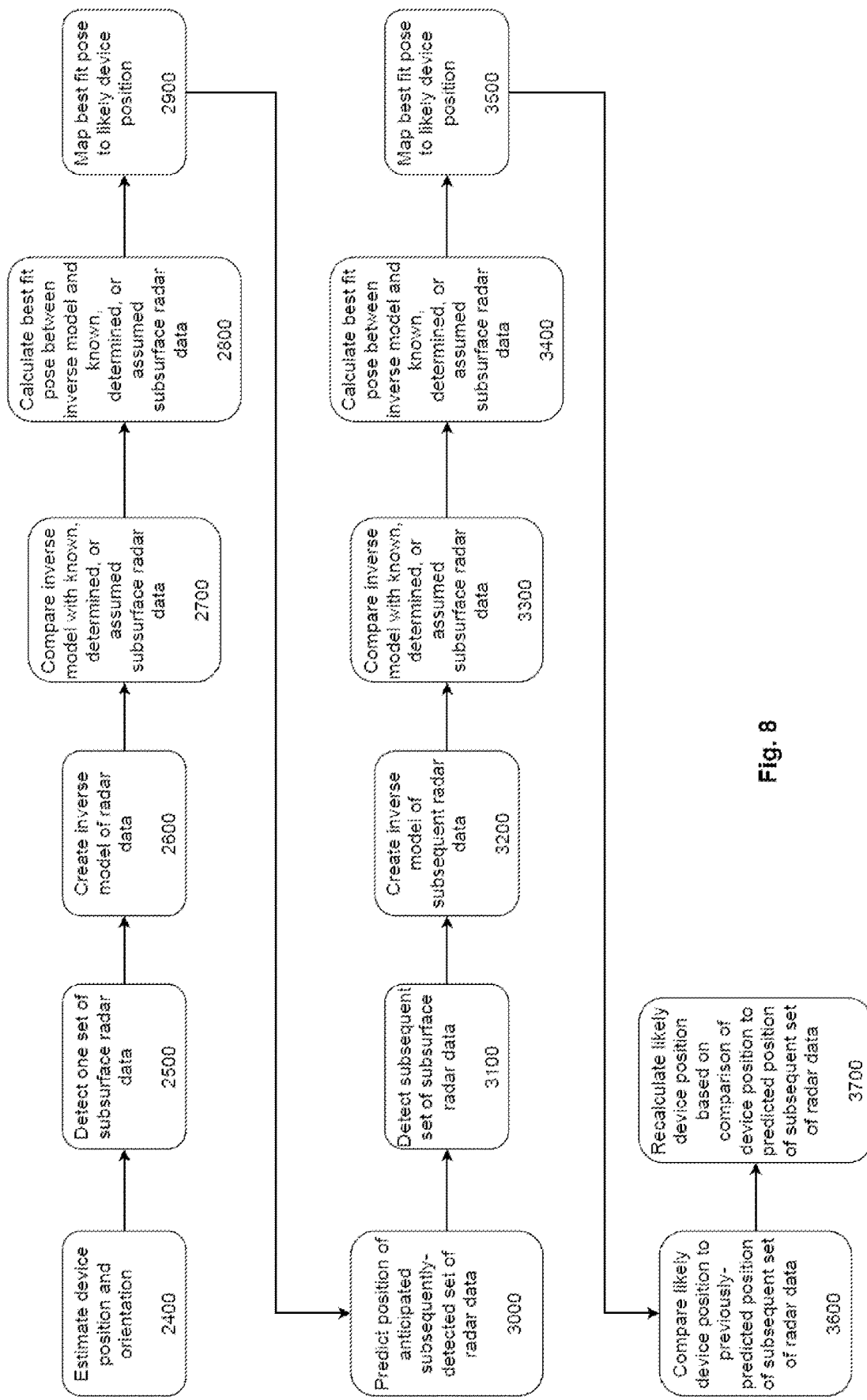
FIG. 8 shows a flowchart of a method of use of a PLD for obtaining improved positional accuracy with ground penetrating radar using multiple detection steps, modeling steps, and predicting steps of an embodiment of the disclosed technology.

FIG. 8 shows a flowchart of a method of use of a PLD for obtaining improved pose accuracy with ground penetrating radar using multiple detection steps, modeling steps, and predicting steps of an embodiment of the disclosed technology. In a step 2400, an estimate of device 10 pose is determined, based on previously collected and analyzed data, including (but not limited to) previously collected and analyzed radar, accelerometer, and gyroscope data. In a subsequent step 2500, the device 10 detects a set of radar data relating to one or more subsurface objects 30, such as by way of the antenna unit 24.

In a subsequent step 2600, the device 10 creates, such as by way of the processor unit 23, an inverse model of the collected set of radar data. In various embodiments, the device 10 may create, such as by way of the processor unit 23, any form of model and/or analysis of the collected set of radar data such that a comparison may subsequently be made using the model and/or analysis. In embodiments, the process of creating an inverse model, or any form of model and/or analysis of the collected data, may be performed externally to the device 10, such as by a method of sending the collected set of radar data to a processor unit external to the device 10 and subsequently retrieving, from a same or different processor unit external to the device 10, an inverse model or any form of model and/or analysis of the collected and subsequently sent set of radar data.

In a subsequent step 2700, the device 10 compares, such as by way of the processor unit 23, the inverse model of the collected set of subsurface radar data to a known, determined, or assumed set of subsurface radar data. In a subsequent step 2800, the device 10 calculates, such as by way of the processor unit 10, a best fit pose between the inverse model obtained in the step 2600 of creating an inverse model and the known, determined, or assumed set of subsurface radar data. The step 2700 of comparison and/or the step 2800 of calculation may furthermore produce a measure of difference between the collected set of subsurface radar data and the known, determined, or assumed set of subsurface radar data.

In a subsequent step 2900, the device 10 maps the calculated best fit pose obtained in the step 2100 of calculating to a likely pose of the device 10. In some embodiments, this mapping is performed by way of calculating an offset of the estimated device 10 pose of the step 2400 of estimating. In a subsequent step 3000, the device 10 predicts a pose, such as relative to the device 10, of an anticipated subsequently-to-be-detected set of subsurface radar data.

In a subsequent set of steps 3100, 3200, 3300, 3400, and 3500, the device 10 repeats the series of steps 2500, 2600, 2700, 2800, and 2900 using a set of subsequently detected subsurface radar data. In a subsequent step 3600, the device 10 compares the calculated likely device pose obtained in the step 3500 of mapping with the predicted pose of anticipated subsequently-detected set of subsurface radar data obtained in the step 3000 of predicting. In a subsequent step 3700, the device 10 recalculates the likely pose of the device 10 based on the comparison obtained in the step 3600 of comparing. The pose of device 10 may be further corrected based on the comparison obtained in the step 3600 of comparing, such as by changing an offset value to be applied to an estimate subsequently made regarding a pose of the device 10.

In embodiments, following the device 10 predicting a pose, such as relative to the device 10, of an anticipated subsequently-to-be-detected set of subsurface radar data, the device 10 performs one or more subsequent comparisons between only the predicted pose of the anticipated subsequently-to-be-detected set of subsurface radar data and one or more sets of subsequently detected subsurface radar data.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A position locating device comprising:
   a ground penetrating radar transceiver; and
   a location determining system;
   wherein said device is configured such that a first detection, by way of said ground penetrating radar transceiver, of a first subsurface object at, at least, two different points, said two different points extending in a direction other than a path of travel of said position locating device during said first detection, is used to correct a pose of said position locating device relative to said first subsurface object based on an assumed or determined linear extent of said subsurface object.

2. The position locating device of claim 1, wherein said direction of said extent of said at least two different points is perpendicular to said path of travel of said position locating device during said first detection.

3. The position locating device of claim 1, wherein a longest extent of said first subsurface object is perpendicular relative to said path of travel of said position locating device.

4. The position locating device of claim 1, wherein a longest extent of said first subsurface object is at a non-right angle relative to said path of travel of said position locating device.

5. The position locating device of claim 1, wherein said device is further configured such that following said first detection of said first subsurface object and said first pose correction, a subsequent second detection, by way of said ground penetrating radar transceiver, of a second subsurface object at, at least, two different points, said two different points extending in a direction other than a path of travel of said position locating device during said second detection, is used to further correct a pose of said position locating device relative to said first subsurface object and said second subsurface object based on an assumed or determined extent of said first subsurface object and said second subsurface object.

6. The position locating device of claim 5, wherein a longest extent of one of said first and said second subsurface objects is perpendicular relative to said path of travel of said position locating device and a longest extent of an other of said first and said second subsurface objects is at a non-right angle relative to said path of travel of said position locating device, at each of a time when said pose correction occurs as a result of travel of said position locating device over a respective said first subsurface object and a time when said pose correction occurs as a result of travel of said position locating device over a respective said second subsurface object.

7. The position locating device of claim 1, wherein said pose correction comprises:
   a detection of said subsurface object in a first axis; and
   a detection of said subsurface object in a second axis; and
   a determination of a location of said position locating device relative to each of said first axis and said second axis;
   wherein said first axis is perpendicular to said second axis; and
   wherein said subsurface object is known, determined, and/or assumed to be linear;
   wherein each of said first axis and said second axis is located along a longest linear extent and/or a shortest linear extent and/or a diagonal linear extent of said subsurface object;
   wherein said determined location is used to detect a pose of said position locating device independently and/or to confirm and/or specify a predetermined pose thereof.

8. The position locating device of claim 7, further comprising at least one antenna;
   wherein said pose correction further comprises a detection of a rotational angle of said position locating device relative to said subsurface object by way of said antenna.

9. The position locating device of claim 1, further comprising an input device, wherein said assumed linear extent of said subsurface object is based on known building code information inputted into said input device.

10. A method of using the position locating device of claim 1, comprising steps of:
    detecting, in a first detection, by way of said ground penetrating radar transceiver, a first subsurface object at, at least, two different points, said two different points extending in a direction other than a path of travel of said position locating device during said first detection; and correcting a pose of said position locating device relative to said first subsurface object using said at least two different points, based on an assumed or determined linear extent of said subsurface object.

11. The method of claim 10, wherein during said step of first detecting, said direction of said extent of said at least two different points is perpendicular to said path of travel of said position locating device.

12. The method of claim 10, wherein during said step of first detecting, a longest extent of said first subsurface object is perpendicular relative to said path of travel of said position locating device.

13. The method of claim 10, wherein during said step of first detecting, a longest extent of said first subsurface object is at a non-right angle relative to said path of travel of said position locating device.

14. The method of claim 10, further comprising the steps of:

further detecting, in a second detecting, following said steps of said first detecting and correcting, a second subsurface object at, at least, two different points, said two different points extending in a direction other than a path of travel of said position locating device during said first step of detecting and/or said second step of detecting; and further correcting a pose of said position locating device relative to said first subsurface object and said second subsurface object, using said at least two different points of said step of second detecting, based on an assumed or determined linear extent of said first subsurface object and said second subsurface object.

15. The method of claim 14, wherein during said step of second detecting, a longest extent of one of said first and said second subsurface objects is perpendicular relative to said path of travel of said position locating device and a longest extent of an other of said first and said second subsurface objects is at a non-right angle relative to said path of travel of said position locating device each of, at each of a time of said first detection and pose correction and a time of said second detection and said further correction.

16. The method of claim 10, wherein said pose correction comprises steps of:

detecting said subsurface object in a first axis;
detecting said subsurface object in a second axis; and
determining a location of said position locating device relative to each of said first axis and said second axis;
wherein said first axis is perpendicular to said second axis; and
wherein said subsurface object is known, determined, and/or assumed to be linear;
wherein each of said first axis and said second axis is located along a longest linear extent and/or a shortest linear extent and/or a diagonal linear extent of said subsurface object;
wherein said determined location is used to detect a pose of said position locating device independently and/or to confirm and/or specify a predetermined pose thereof.

17. The method of claim 16, wherein said position locating device further comprises at least one antenna; wherein said pose correction further comprises a step of detecting a rotational angle of said position locating device relative to said subsurface object by way of said antenna.

18. The method of claim 10, wherein said position locating device further comprising an input device;
wherein said method further comprises a step of inputting known building code information into said input device;
wherein said known building code information comprises at least said assumed linear extent of said subsurface object.

19. A method of correcting for pose errors of a position locating device, comprising the following steps:

determining a substantial pose error of a position locating device;

detecting, in a first step of detection, by way of a ground penetrating radar transceiver of said position locating device, at least one set of subsurface radar data;

creating, using said at least one set of subsurface radar data, an inverse model of reflections and/or diffractions included within said at least one set of subsurface radar data;

comparing said inverse model with known, determined, and/or assumed subsurface data;

calculating a best-fit pose between said inverse model and said known, determined, and/or assumed subsurface data;

mapping said best-fit pose to a most likely pose of said position locating device; and predicting at least one most likely pose of at least one anticipated subsequent set of subsurface radar data to be detected, in at least a second step of detection, by way of said ground penetrating radar transceiver of said position locating device.

20. The method of claim 19, further comprising the following steps:

detecting, in a second step of detection, at least one subsequent set of subsurface radar data;

creating, using said at least one subsequent set of subsurface radar data, an inverse model of reflections and/or diffractions included within said at least one subsequent set of subsurface radar data;

comparing said inverse model with known, determined, and/or assumed subsurface data;

calculating a best-fit pose between said inverse model and said known, determined, and/or assumed subsurface data;

mapping said best-fit pose to a most likely pose of said position locating device;

comparing said determined most likely pose of said position locating device based on said at least one subsequent set of subsurface radar data with said previously-predicted most likely pose of said position locating device;

determining, based on said comparison, a most likely pose of said position locating device; and predicting, based on said determined most likely pose of said position locating device, at least one most likely pose of at least one additional anticipated subsequent set of subsurface radar data to be detected, in at least a third detection, by way of said ground penetrating radar transceiver of said position locating device.

* * * * *